UNITED STATES PATENT OFFICE.

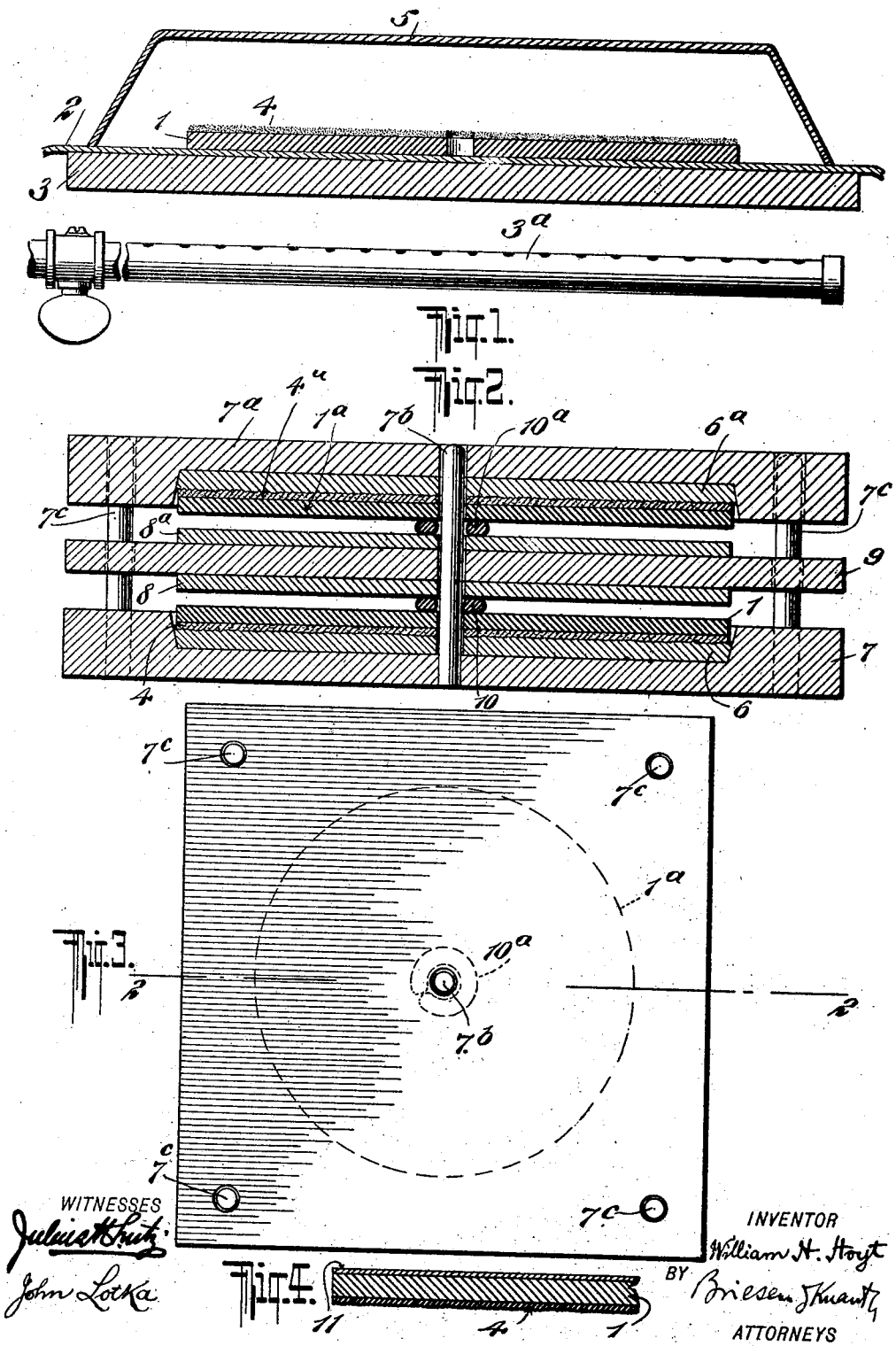

WILLIAM HELM HOYT, OF WYOMING, NEW JERSEY.

METHOD OF MAKING MOLDED FLAT SOUND-RECORDS.

No. 867,975.	Specification of Letters Patent.	Patented Oct. 15, 1907.

Application filed October 17, 1906. Serial No. 339,330.

*To all whom it may concern:*

Be it known that I, WILLIAM HELM HOYT, a citizen of the United States, and a resident of Wyoming, county of Essex, and State of New Jersey, have invented certain new and useful Improvements in Methods of Making Molded Flat Sound-Records, of which the following is a specification.

My invention relates to methods for making molded articles and particularly molded flat sound records for talking machines and has for its object to cheapen the cost of manufacture of such articles without impairing the efficiency or wearing qualities thereof.

Reference is to be had to the accompanying drawing in which

Figure 1 is a vertical section illustrating one of the steps of my method; Fig. 2 is a vertical section showing the mold employed, at a subsequent stage of the process, the section being taken on line 2—2 of Fig. 3; Fig. 3 is a plan view of such mold; and Fig. 4 is a cross-section of part of a record made according to my invention.

In manufacturing records or other articles according to my improved method I first take a lot of stock which I will call A, and which is composed of very cheap material such as refined asphaltum or resinous material and form it into disks 1 of the required size and thickness in any convenient manner, as for instance by means of a suitable machine. Then I take a second stock which I will call B and which is composed of high-grade material and grind it into a very fine powder. As an example of a material suitable for this stock B, I will describe a body obtained by mixing and heating so as to cause them to form a coherent mass, the following ingredients:

Shellac 40 parts (by weight),
Shoddy 6 "
Asbestos 5 "
Pigment 4 "
Clays 45 "

These clays may be a mixture of barytes, china clay, pipe clay, etc. Thereupon I take a piece 2 of muslin or canvas or other suitable material and place it on a heating table 3 which may be of any customary construction. A disk 1 made of the stock A is now taken and one surface of said disk is covered with the powdered B stock, as indicated at 4. Just enough powdered B stock is used to cover the surface of the disk evenly. I now place the disk made of A stock and sprinkled with B stock on top of the muslin 2 on the table 3 (heated by a gas burner 3ª or otherwise) with the powdered side upward and cover it with a pan 5 or other suitable article to confine the heat so that the disk 1 quickly becomes soft or plastic. When the disk has become sufficiently plastic the powdered B stock and the disk of A stock become one coherent mass. While in this state, I remove the disk from the heating table by means of the muslin or other fabric, and place it on the face of a matrix 6 in a mold 7 with the surface of the disk to which the powdered B stock was applied next to matrix face. I now remove the muslin or other fabric which is only used as a convenient means for removing the disk from the heating table, and place a plate next to the disk. This plate preferably consists of two members, the lower one of which 8 is of the same size as the disk, while the upper member 9 is much larger, being guided on pins 7ᵇ and 7ᶜ. The arrangement is duplicated above the plate 9 in reverse order the corresponding parts being designated by the same reference numerals with the addition of the index "ª". Pressure is then applied and maintained until the record disks have become cold after which said disks are removed and are ready for use. The entire mold, that is, both matrices 6 and 6ª as well as the intermediate plate 9 and top plate 7ª are heated before the molding operation. I prefer to place some loose material such as a hot soft lump (10 or 10ª) of A stock or other plastic material on the central portion of the disk 1 before the molding pressure is applied, so that this lump may spread toward the periphery and in so doing drive out the air from between the plate 8 or 8ª and the disk. In the finished article (Fig. 4) this material forms a coating 11 on the side of the record disk 1 opposite to that coated with B stock and containing the record groove impressed by the matrix. Any suitable construction may be employed for the mold, the drawings show it provided with a centering pin 7ᵇ and guide pins 7ᶜ.

The grooved face of my improved record which is subjected to wear is thus composed of high-grade material, while the remainder of the record is made of comparatively cheap stock. This results in a record with the same qualities as if the entire disk were made of the best materials, while the cost of making such record is reduced to a minimum.

Two records are made simultaneously with the arrangement described, but when it is desired to make only one record, the parts above the plate 9 are omitted, and pressure is applied to said plate directly.

Old or worn records of the present kind may be used as equivalents of the disks 1 made of A stock, such old records being sprinkled with B stock and treated as above described, thus resulting in a new and better record. This also effects a big saving as by treating old records in this manner the necessity for making disks of A stock is avoided. In either case the disks (whether old records or especially made) form a foundation for the coating of powdered B stock.

Various modifications may be made without departing from the nature of my invention as defined in the claims.

It will be understood that the relative sizes of various parts, and particularly those of the sound record layers, have been considerably exaggerated in the drawings, for the sake of clearness.

I claim

1. The herein described method of making flat molded articles, which consists in applying to the upper surface of a flat foundation which becomes plastic under the influence of heat, a layer of powdered material having like properties, heating the foundation and said layer to cause them to unite, then placing on the other surface of the foundation, near the center, some loose material of the same character, and applying heat and pressure to cause said loose material to expand and expel the air, and the entire article to be molded.

2. The herein described method of making molded articles, which consists in applying to the upper surface of a foundation which becomes plastic under the influence of heat, a layer of powdered material having like properties, exposing both the foundation and the applied powdered layer to heat to cause them to unite, and thereupon transferring the entire article to a mold and subjecting it to pressure therein while hot.

In testimony whereof I have hereunto subscribed my name in the presence of two subscribing witnesses.

WILLIAM HELM HOYT.

Witnesses:
JOHN LOTKA.
JOHN A. KEHLENBECK.